United States Patent [19]

Haynes

[11] 3,715,498

[45] Feb. 6, 1973

[54] SCANNING SYSTEM WHICH INCLUDES MEANS FOR CONTROLLING PICTURE SAMPLING DENSITY

[75] Inventor: Harold E. Haynes, Cranbury, N.J.

[73] Assignee: RCA Corporation

[22] Filed: Sept. 7, 1971

[21] Appl. No.: 178,330

[52] U.S. Cl. ....................178/69.5 F, 178/7.1

[51] Int. Cl. ....................H04n 1/04

[58] Field of Search .........178/69.5 F, 6.8, 6.6 P, 7.6, 178/7.1, 6

[56] References Cited

UNITED STATES PATENTS 3,328,523 6/1967 Treseder et al. ....................178/6.8

3,564,127 2/1971 Sziklai et al. ....................178/6.6

*Primary Examiner*—Richard Murray

*Attorney*—H. Christoffersen

[57] ABSTRACT

Clock signals are recorded on an erasable track, such as a magnetic track, on the surface of a facsimile-type drum. These signals are read from the drum during the optical scanning process and employed to sample the electrical signal produced by the optical scanner. Any desired sampling density in the circumferential direction, over a relatively broad range, may be achieved by control of the frequency at which the clock signals are recorded on the erasable track. The same sampling density in the axial direction may be obtained by control of the speed, in the direction of the drum axis, of the optical scanner.

3 Claims, 3 Drawing Figures

INVENTOR.
Harold E. Haynes
BY
ATTORNEY

INVENTOR.
Harold E. Haynes
BY Samuel Cohen
ATTORNEY

SCANNING SYSTEM WHICH INCLUDES MEANS FOR CONTROLLING PICTURE SAMPLING DENSITY

BACKGROUND OF THE INVENTION

A mechanical, facsimile-type scanner includes a drum driven at high speed which supports on its surface the picture it is desired to reproduce. An optical pick-up device, such as a photo-multiplier or the like, located adjacent to the drum surface, is driven in the direction of the drum axis as the drum rotates. This pick-up device and its associated optical elements is known as an optical scanner. The scanning motion described easily may be achieved, for example by mounting the pick-up device and its optics on a lead-screw parallel to the drum surface, and suitably driving this lead-screw.

The optical scanner converts the optical signal it receives to an electrical signal whose instantaneous amplitude is proportional to the light it receives from the picture being scanned. The electrical signal is sampled prior to transmission or further processing, by clock pulses which may be employed to control an amplifier for the signal.

The scanning process must be performed with high geometrical precision if the reproduced picture is to be free of visible defects. The sample points on successive revolutions of the drum must "line up" extremely accurately or else spurious wavy patterns will be visible in the reproduced picture. One solution to this problem is to provide an extremely constant angular drum velocity and to employ an extremely stable oscillator to provide the clock or sample pulses. Another is to employ means, fixed to the shaft of the facsimile drum, and therefore rotating at the same speed as the drum, for providing a sample pulse train whose frequency is exactly proportional to the instantaneous drum velocity.

An example of the latter approach appears in Wilby U.S. Pat. No. 3,541,245 "Electro Optical Drum Scanners for Image Reproduction Permitting Variable Image Enlargement or Reduction" issued Nov. 17, 1970. Here, the sample pulses are produced by a pick-up which receives light passing through a slitted disc fixed to the drum shaft. This general approach, that is, the approach of deriving the sample pulses from means fixed to the drum shaft, is a preferred approach for cost reasons. However, it does have one serious disadvantage and that is that the picture sampling density is constant.

In a number of applications as, for example, in providing an enlargement or reduction of the image being scanned, it is important to be able to change the picture sampling density. Moreover, it is desirable that the sampling density be variable over a relatively wide range and that it still be possible to have high geometrical precision and equal spacing between picture samples in both the *x* (circumferential) and *y* (axial) directions (equal *x* and *y* "granularities"). The purpose of the present invention is to provide a simple and inexpensive way of achieving these ends.

SUMMARY OF THE INVENTION

A drum includes a surface on which data to be scanned may be located and includes also an erasable record track. The drum continuously is driven at an approximately constant speed. A controllable oscillator is employed to record sampling signals on the record track at a desired data sampling density. The data to be scanned is read by driving the scanner in the direction of the drum axis and sampling the signal produced by the scanner in response to the sampling signals recorded on the record track. In a preferred form of the invention, the speed at which the scanner is driven axially is such as to obtain equal sampling densities in both the circumferential and axial directions.

DETAILED DESCRIPTION

Figure 1:
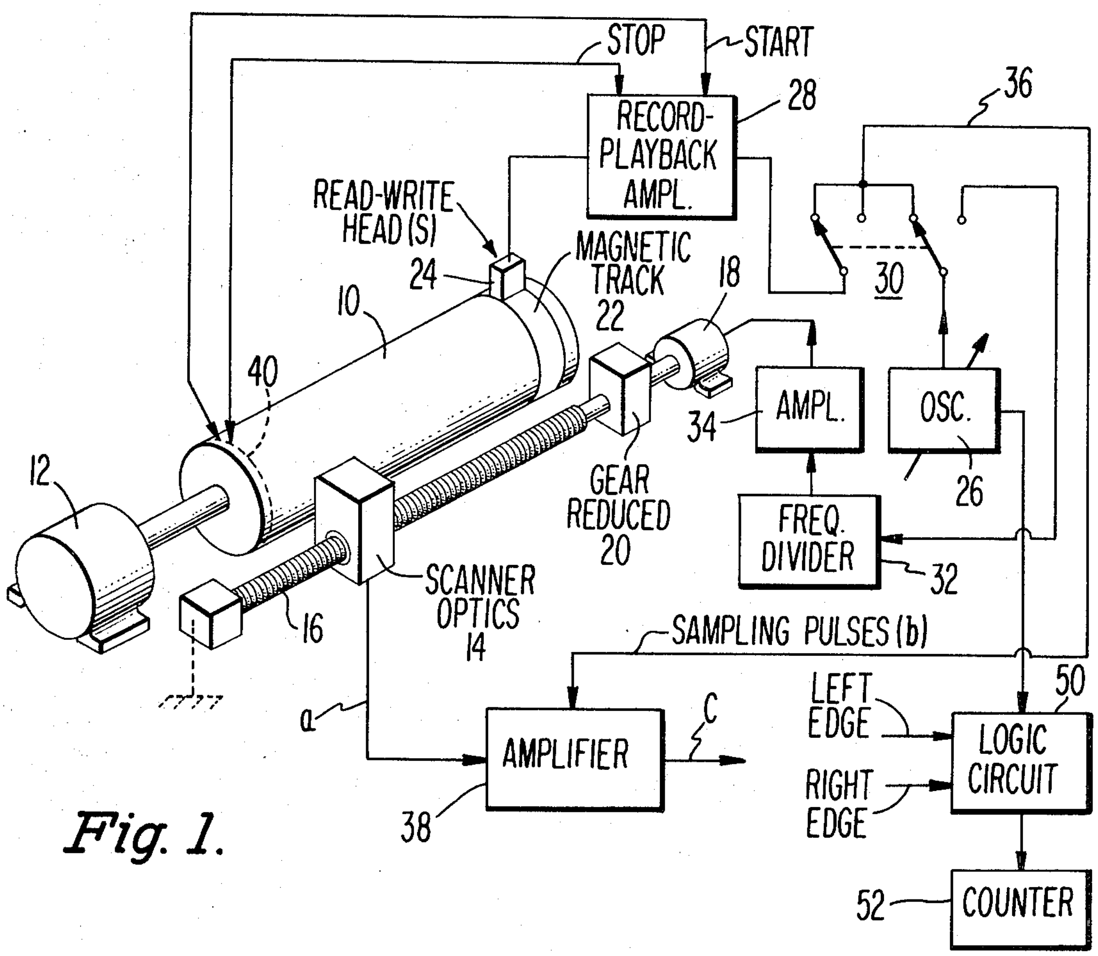
FIG. 1 is a block diagram of a preferred form of the present invention.

The system shown in FIG. 1 includes a facsimile drum 10 which is driven at high speed by a drive motor 12. The latter, for example, may be an 1,800 revolution per minute (rpm) motor operated directly from the power line. The scanner optics 14, which may include a photo-multiplier or other pick-up device and suitable optical elements, is movably mounted on a lead-screw 16. The lead-screw is driven by motor 18 through a suitable fixed gear reducing mechanism 20.

A magnetic track 22 is located at one end of the drum, Signals may be recorded on this track by a magnetic head within housing 24. A variable frequency oscillator 26 may be connected through the recording amplifier within block 28 to this head when the double-pole, double-throw switch 30 is in the position shown.

When the switch 30 is in its other position, the oscillator 26 drives the motor 18 via frequency divider 32 and amplifier 34. Motor 18 may be a synchronous motor, or any type in which speed is strictly proportional to drive frequency. When the switch 30 is in this other position, a read head within housing 24 supplies a signal to the playback amplifier within block 28. The signals produced by this amplifier are applied by lead 36 to the amplifier 38 for sampling the electrical signal produced by scanner 14.

In the operation of the system of FIG. 1, the drum 10 is driven at a substantially constant speed by motor 12. At this speed, the drum surface moves at a certain peripheral velocity V and it is easy to calculate from this value what oscillator 26 frequency is needed to record on the magnetic track 22 pulses having some desired sampling density. The oscillator 26 is adjusted to this frequency and slightly less than one full revolution (slightly less than 360°) of clock signals are recorded on the track 22, to keep the recorded signals from overlapping one another. The recording process may be controlled by start and stop signals. Such signals may be derived from closely adjacent magnetized marks located along a second magnetic track 40 on the drum. Alternatively, rather than recording such signals magnetically, optical or other signals may be employed for the same purpose.

After the magnetic track 22 has been recorded, the drive frequency necessary for the lead-screw motor 18 is calculated. Usually, it is desired that this drive frequency be such that the picture sampling density in the axial direction is equal to the picture sampling density in the circumferential direction. The oscillator 26 is now adjusted to the proper frequency to obtain this motor 18 speed. (An example of how these various calculations are performed is given below).

After the adjustments above have been made, the switch 30 is thrown to its second position and the scanning is performed. The recorded clock track 22 provides the sampling points along one axis (the sampling points in the circumferential direction of the drum) and the oscillator driving the lead-screw motor provides such an axial advance velocity that the sampling points in the other direction (the direction of the drum axis) are spaced as desired. Preferably, the sampling densities in both directions are the same. Since the identical clock track is used for every drum revolution, there will be no wavy patterns in the reproduced signal, even if the drum speed has minor fluctuations. In addition, as the frequency of oscillator 26 can be adjusted in continuous fashion, there is complete flexibility of sample point spacing. This is true for both scanning directions.

Figure 2:
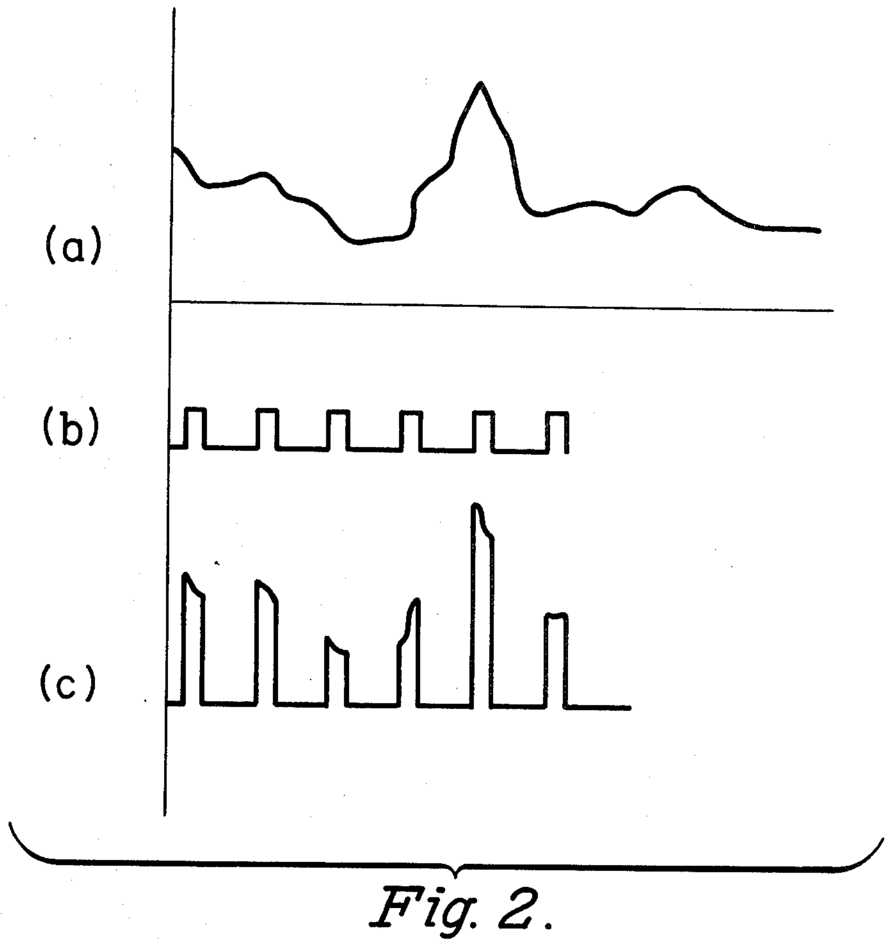
FIG. 2 is a drawing of waveforms useful in explaining the operation of the system of FIG. 1.

FIG. 2 shows a number of the waveforms produced during the operation of the system. The scanner optics 14 produces the varying amplitude electrical signal *a* representing the picture being scanned. The amplifier 38 is normally off but is gated on during each of clock or sampling pulses *b* read from the magnetic track 24. The pulses *c* produced by the amplifier 38 occur during the clock pulse intervals and each has an instantaneous amplitude proportional to the signal *a* then being applied to the amplifier.

To produce a sampling density of S points per inch, the clock frequency $f_x$ must be $VS$, where $V$ is the drum peripheral velocity in inches/second and is constant. At the same time, the velocity at which the scanner optics 14 is moved in the axial direction of the drum must vary inversely as $S$. This can be seen in a qualitative way by considering a simple example — increasing the sampling density by a factor of two. It is clear that, at a fixed drum speed, this requires that the axial advance velocity of scanner 14 be halved. In other words, the oscillator frequency $f_y$, when driving the lead-screw motor 18, must be $f_y = K/S$ where $K$ is a constant which takes into account the lead-screw pitch, the gear reduction ratio of reducer 20, and the frequency division ratio N produced at 32. Thus, the frequency of oscillator 26, when recording the track 22, and its frequency when driving the lead-screw motor 18, must be reciprocally related.

$$f_x \cdot f_y = VS \cdot K/S = VK \quad (1)$$

Suppose the drum diameter is 4 inches and the drum velocity = 1,800 rpm. Then $$V = 4\pi(1{,}800)/60 = 377 \text{ inches/sec} \quad (2)$$

Suppose also that one value of sampling density of interest is $S = 100$ samples/inch. Then $$f_x = VS = 377 \text{ inches/sec} \cdot 100 \text{ samples/inch} \quad (3)$$

$$= 37{,}700 \text{ samples/sec or } 37.7 \text{ KHz}$$

The oscillator frequency for driving the lead-screw 16 during scanning is $$f_y = K/S \quad (4)$$

where: $K$ is a constant and is dependent on the gear reduction ratio at 5, the pitch of the lead-screw 16 and N, the frequency division ratio at 32. In this example, $K$ may be chosen to have a value so that when $S = 100, f_x = f_y$. Then from (4), $$K = f_y S = f_x S = 3.77 \times 10^6 \quad (5)$$

At this (and all other) densities, the $x$ and $y$ sampling frequencies are $$f_x = VS = 377S \quad (6)$$

$$f_y = K/S = 3.77 \times 10^6/S \quad (7)$$

In a particular application, a reasonable range of values for $S$ is 30 to 300 samples/inch. The corresponding ranges of $f_x$ and $f_y$ are given in the table below. The table also shows these values for $S = 100$.

| $S$ | $f_x$ | $f_y$ |
|---|---|---|
| 30 | 11.3 KHz | 126 KHz |
| 100 | 37.7 KHz | 37.7 KHz |
| 300 | 113 KHz | 12.6 KHz |

Thus in this application, oscillator 26 should have a range from 11.3 KHz to 126 KHz.

In the practical operation of the system of the present invention, the "scale-factor" desired may not be known explicitly. Instead, what may be known is that a given input picture (or a part of it designated by cropping marks) is to be reproduced to a specified width (the $x$ or circumferential dimension). It is also known that for a given granularity desired, this width will correspond to a specific number of sample points. With this information available, the oscillator 26 can be set to the desired frequencies for recording and playback in the following way.

First, cursors or limit flags (which may be optical marks which can be decoded by means within the scanner optics block to provide "left edge" and "right edge" marks) are placed on the picture at the positions of the $x$ crop marks. During one revolution of the drum, both marks will be sensed. The signals produced in response to these limit flags may be employed to turn on and turn off a gate within block 50. Circuits may be included within block 50 to keep this gate off, after it is turned off, until manually released or primed.

The oscillator now is set to some value which the operator believes to be close to the one needed to obtain the desired number of sampling points between the two limit flags and the gate within circuit 50 is manually released (primed). During the following drum revolution, when the "left edge" signal is produced, gate 50 is enabled and the counter starts counting the pulses produced by oscillator 26 and when the "right edge" signal is produced, gate 50 is disabled and the counter 52 stops. The count then present in the counter corresponds to the actual number of sample points along the width of the picture (that is, along the circumferential direction between the two flags) for that frequency $f_x$. In general, the initial frequency of oscillator 26 will be incorrect, that is, the count recorded in the counter 52 will be greater than or less than the specified number of sample points desired for given picture width. In either case, the operator adjusts the oscillator 26 frequency and repeats the process a sufficient number of times until the number of sample points obtained (the count on counter 52) is sufficiently close to the desired value. The oscillator 26 is now at the correct value for $f_x$. This frequency is now recorded on magnetic track 22.

To find the correct value of $f_y$, the formula $f_y = VK/f_x$ is employed. The oscillator 26 is now set to this value and the switch 30 thrown to the correct position for playback.

Figure 3:
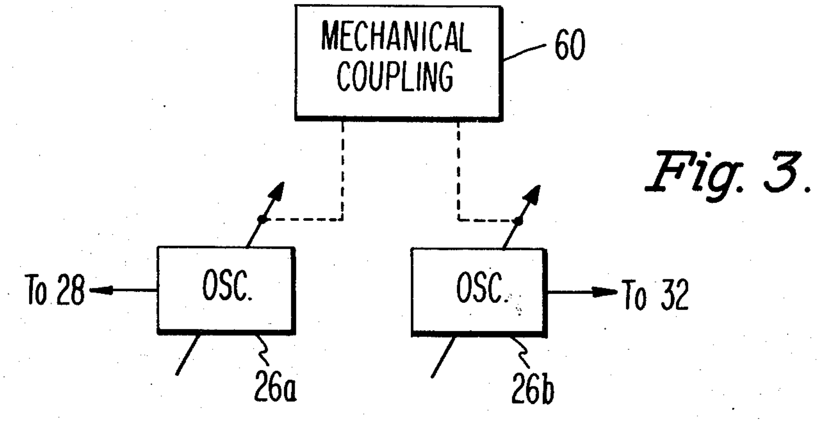
FIG. 3 is a block diagram of a portion of a modified form of the invention.

In the embodiment of the invention shown in FIG. 1, a single oscillator 26 is employed both to record the sample pulse track 22 and to drive the drive motor 18 for the lead-screw. This requires that the oscillator 26 be adjusted to two different frequencies. FIG. 3 shows an alternative approach. Here, two oscillators 26*a* and 26*b* are employed. The tuning elements, illustrated by arrows, for these oscillators are mechanically coupled by the coupling 60 in such a way that the frequency produced by one oscillator is reciprocally related to that produced by the other. The frequency $f_x$ produced by oscillator 26*a* is equal to $VK/f_y$. Both oscillators can be similar and in the example illustrated by the table above, can operate through similar, although not identical, frequency ranges. A second advantage of the arrangement of FIG. 3 is that the switch 30 may be eliminated. In operation, when one oscillator is on the other is turned off.

What is claimed is:

1. In combination:

a drum having a surface on which data to be scanned may be located and including an erasable record track;

means continuously driving said drum at an approximately constant speed;

a controllable oscillator;

a scanner positioned to read said data and movable in the direction of the drum axis;

means for adjusting said oscillator to a frequency at which a desired sampling density, in the circumferential direction of the drum, will be obtained;

means responsive to said oscillator for recording on said record track sampling signals at said sampling density; and means reading the data to be scanned comprising means for driving said scanner in the direction of the drum axis and means responsive to said record track for sampling the signal produced by said scanner.

2. In the combination as set forth in claim 1, said means reading the data to be scanned comprising means for driving the scanner at a speed to produce the same sampling density in the axial as in the circumferential scanning directions.

3. In the combination as set forth in claim 1, said means for driving the scanner in the direction of the drum axis comprising the same controllable oscillator as employed for recording on said record track.

* * * * *